United States Patent
Lackey

(10) Patent No.: US 9,638,547 B2
(45) Date of Patent: May 2, 2017

(54) SELECTIVE SLOPE LINEAR POSITION SENSOR

(71) Applicant: Continental Automotive Systems, Inc., Auburn Hills, MI (US)

(72) Inventor: John Jefferson Lackey, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 969 days.

(21) Appl. No.: 13/724,301

(22) Filed: Dec. 21, 2012

(65) Prior Publication Data

US 2014/0176131 A1 Jun. 26, 2014

(51) Int. Cl.
*G08B 21/00* (2006.01)
*G01V 3/20* (2006.01)
*G01D 5/14* (2006.01)

(52) U.S. Cl.
CPC .................................. *G01D 5/145* (2013.01)

(58) Field of Classification Search
CPC . G08B 21/00; B60Q 1/00; G01V 3/20; G01V 1/52; G01V 3/00
USPC .......... 324/207.21, 252, 363, 347, 358, 444, 324/447–449, 515, 207.24, 207.26; 338/32 R
See application file for complete search history.

(56) References Cited

U.S. PATENT DOCUMENTS

| | | | |
|---|---|---|---|
| 5,493,216 A * | 2/1996 | Asa ........................ | G01V 3/081 324/207.2 |
| 6,211,668 B1 | 4/2001 | Duesler et al. | |
| 6,753,680 B2 | 6/2004 | Wolf | |
| 2007/0114990 A1* | 5/2007 | Godkin .................. | G01D 5/145 324/207.24 |
| 2008/0218004 A1* | 9/2008 | Mukaide ................ | H02K 41/03 310/12.25 |
| 2011/0040513 A1* | 2/2011 | O'Gorman .............. | F16H 59/70 702/94 |

* cited by examiner

*Primary Examiner* — Melissa Koval
*Assistant Examiner* — Taqi Nasir

(57) ABSTRACT

A three-magnet assembly configured for use in a position sensing system is disclosed. In an example, the three-magnet assembly establishes a non-linear spatially varying magnetic field configured to be measured by a magnetic field measurement device so that resolvable measurements are spatially distributed in a non-linear fashion. The resolvable measurements are distributed to a relatively higher concentration in at least one first region along a measurement stroke and to a relatively lower concentration in at least one second region along a measurement stroke, the second region being different from the first region. In an example, the different concentrations of resolvable measurements are utilized to spatially vary the precision of a position sensor along a measurement stroke. A system and methods for correlating magnetic field measurements to expected positions are also disclosed.

20 Claims, 3 Drawing Sheets

SELECTIVE SLOPE LINEAR POSITION SENSOR

BRIEF DESCRIPTION OF THE DRAWINGS

For a more complete understanding of the disclosure, reference should be made to the following detailed description and accompanying drawings wherein.

Figure 1:
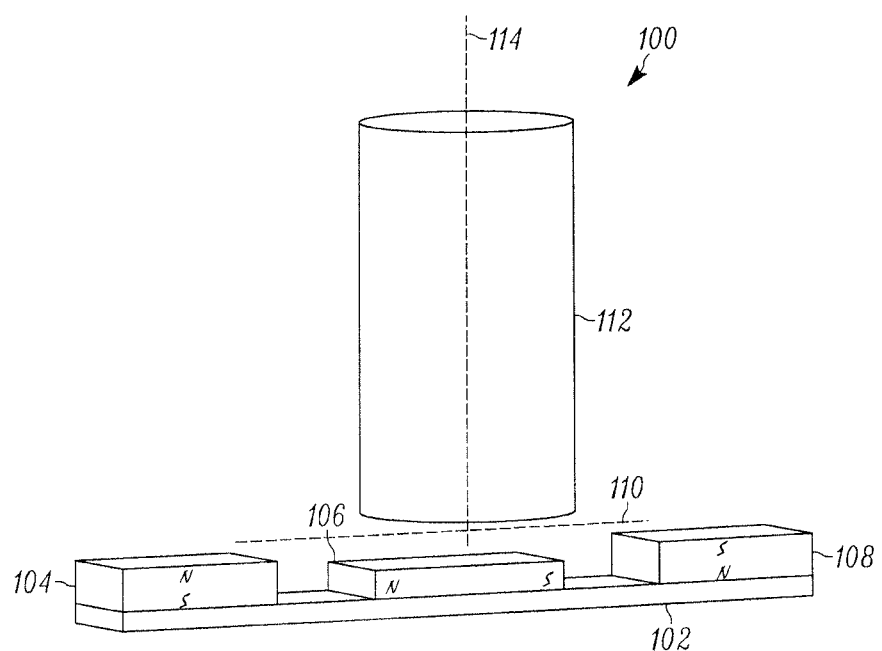
FIG. 1 comprises an exemplary magnetic sensing assembly.

Skilled artisans will appreciate that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the present invention. Also, common but well-understood elements that are useful or necessary in a commercially feasible embodiment are often not depicted in order to facilitate a less obstructed view of these various aspects of the present invention. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Sensing position is often important to integrating mechanical and electronic, optical, and optoelectronic devices. Consequently, a variety of approaches to position sensing have been developed.

One approach to sensing position is measuring a magnetic field of a magnet or a magnet assembly and then correlating at least one magnetic field measurement to at least one expected position corresponding to that field measurement.

Because the magnetic field is a vector field, at least two components of magnetic fields can be measured: the magnitude and the direction. The magnitude and direction measurements may also be combined. In addition, the measurements may be made with respect to a predefined measurement axis or along a predefined stroke.

Depending on the application, the magnetic field may be measured by measuring the magnitude or direction of a repulsive or attractive force on an object or charge placed or moved in the field, for example a current, a magnet or a ferromagnetic material, by measuring the magnetoresistance of a material, by measuring the viscosity of a magnetorheological fluid, by measuring the Lorentz force, by measuring the Hall effect, or by using a fluxgate, a superconducting quantum interference device, or a spin exchange relaxation-free magnetometer, as well as by other means which will be appreciated by a person of ordinary skill in the art.

It is often desirable for position sensing devices to maintain a linear correlation between magnetic field measurements and the expected positions, for example, to keep the electronics, calibration, or programming simple and inexpensive, or to offer a position sensing device generally suitable for a wide variety of applications. It is also often desirable for the position resolution to be constant over the stroke of the sensing device. Consequently, linearity of the magnetic field measurements and constancy of the magnetic field measurement resolution often dominate design considerations. Furthermore, often accommodations are made to account for any deviations from perfect linearity of correlation or constancy of resolution to arrive at a substantially linear transfer function.

However, in certain applications it is desirable to sense position to higher resolutions in certain regions, while sensing position at lower resolutions in other regions may be sufficient. Increasing position resolution over all of the regions addresses such applications. Nonetheless, the limitations of the measurement device, for example, the relationships between the measurement noise, the precision, saturation points, ceilings and thresholds ultimately limit the number of resolvable measurements within the measurement tolerance levels, and thus place a limit on position resolution. Also, using a more precise measurement device with a greater range typically increases the cost and complexity of the position sensor and related programming.

Consequently, in some applications position sensing at a constant resolution is not desirable. Rather, it may be desirable to spatially distribute resolvable measurements in a non-linear fashion, concentrating them in some areas and spreading them further apart in others, thus increasing position resolution in some areas and reducing it in others. Even though the position resolution may vary spatially, it may still be desirable in some applications to sense the position uniquely, for example, by maintaining a one to one correlation between resolvable measurements and corresponding expected positions.

A one to one correlation may be maintained by ensuring that the magnetic field measurements are strictly monotonic within the measurement stroke, taking into account the measurement tolerance levels. Monotonic means that a measurement value, taking into consideration measurement tolerances, continuously transitions from a first extremum toward a second extremum or remains constant with respect to movement in one direction along the measurement stroke, and analogously transitions from the second extremum toward the first extremum or stays constant when the movement along the measurement stroke is reversed, but does not transition from a first extremum toward a second extremum in a first region of the measurement stroke and from the second extremum toward the first extremum in a second region of the stroke while the movement is in the same direction over both regions of the measurement stroke. Strictly monotonic means that a measurement value is monotonic, but, taking into consideration measurement tolerances, does not stay constant over any region of the measurement stroke. Measurement tolerances should be taken into account as allowable deviations from perfect monotonicity and perfect strict monotonicity because in physical systems, in contrast to theoretical models, perfect monotonicity and perfect strict monotonicity may not be achievable due to factors such as, for example, measurement noise.

The resolution of position sensing through magnetic field measurement may be spatially varied by establishing a magnetic field that non-linearly spatially varies within the measuring stroke with respect to at least one measurable component. The measurable component may be, for example, the magnetic field magnitude, the magnetic field direction, or otherwise.

Although two-magnet assemblies establish non-linearly spatially varying magnetic fields, in practice the non-linearity is often insufficient to significantly vary the concentration of resolvable measurements between higher resolution and lower resolution regions. In contrast, three-magnet assemblies increase the desirable non-linearity of the magnetic field and permit the maintenance of substantial monotonicity and range of measuring capability. Moreover, three-magnet assemblies allow the use of smaller, weaker, and thus less expensive magnets than would typically be used in two-magnet assemblies. Three-magnet assemblies also permit more flexibility in adjusting the flatness of the magnetic field measurements in the middle region of the measurement stroke, adjusting the sharpness, e.g. convexity or concavity, of the transitions between the middle region and the end regions of the measurement stroke, and adjusting the transfer function, that is the relationship between the physical position and the sensed position.

With reference to FIG. 1, the non-linearly spatially varying magnetic field is set up by an exemplary magnet assembly 100 comprising at least three magnets, a first 104, a second 106, and a third 108 magnets, positioned along one side of a ferromagnetic pole piece 102. In this example, the pole piece is also a stabilizer bar. The first 104 and third 108 magnets are arranged near the opposite ends of the pole piece 102 to be a substantially parallel to each other according to their magnetic axes so that the north pole of the first magnet 104 and the south pole of the third magnet 108 face in substantially the same direction. The second magnet 106 is arranged between the first 104 and third 108 magnets so that the second magnet's 106 north pole substantially faces the one of the first 104 and third 108 magnets whose north pole faces away from the pole piece, and the second magnet's 106 south pole substantially faces the other one of the first 104 and third 106 magnets. However, in other examples, the assembly need not comprise the pole piece 102, so long as the geometric arrangement of the three magnets is generally preserved.

In this example, the second magnet 106 is arranged near the midpoint of the distance between the first 104 and third 108 magnets. However, in other examples the second magnet 106 may be arranged at some distance from the midpoint of the distance between the first 104 and third 108 magnets. In this example, the magnetic axes of the first 104 and third 108 magnets are substantially orthogonal to the side of the pole piece 102 and the second magnet's 106 magnetic axis is substantially parallel to the side of the pole piece 102.

Furthermore, the pole piece 102 in this example is a cuboid unitary bar comprising Ni/Fe 50/50 material with relative permeability of about 8000, length of about 44 mm, width of about 6.35 mm, and height of about 1 mm. However, it will be understood that unitary pole pieces of different suitable composition, shape or dimensions, or suitable combinations of similar or dissimilar pole piece elements, for example laminates or otherwise, may also be used.

Similarly, the magnets 104, 106, and 108, in this example are also cuboid unitary bars. In particular, the magnets 104, 106, and 108 in this example are rare-earth permanent magnets with coercivity $H_cB$ of 433 kA/m and remanence $B_r$ of 0.64 T, where the first 104 and third 108 magnets each have a length of about 9.9 mm, width of about 6.35 mm and height of about 2.54 mm and the second magnet 106 has a length of about 12 mm, width of about 6.5 mm and height of about 1.7 mm. Accordingly, it should be understood that the second magnet 106 in this example is thinner and longer than the first 104 and third 108 magnets. However, the second magnet 106 may also be of other dimensions suitable to the application, for example it may have the same or larger dimensions as the first 104 and third 108 magnets, or otherwise. It should also be understood that although in this example the magnets are permanent magnets other suitable magnets, magnetic devices, coils through which a current flows to produce a magnetic field, or otherwise may also be used. Moreover, although in this example the magnets are all of the same type and magnetic characteristics, the magnets are not required to be all of the same type and magnetic characteristics, and thus may each be of a different type and magnetic characteristics. Furthermore, suitable combinations of magnets, including combinations of magnets of different types, shapes or dimensions, or magnetic characteristics may be used instead of any of the unitary magnets.

Also, although the magnets 104, 106, 108 and the pole piece 102 in this example are generally cuboid in this example, they may also each be of different shapes and geometries, for example prismatoids, parallelepipeds, cuboid frustra, wedges, cylinders, half cylinders, or otherwise. Therefore, it will be understood that the magnets 104, 106, 108 and the pole piece 102 are not required to be of a similar shape or geometry, and thus the magnets and the pole piece may also be of different shapes and geometries from each other.

The dashed line segment above the magnetic assembly represents an exemplary measurement stroke 110 for measuring the magnetic field with respect to a measurement axis 114 by a measurement device, the measurement device comprising a magnetic field sensor 112 at an exemplary operating distance.

In this example, the magnetic field is measured with respect to the measurement axis 114, the measurement axis 114 being substantially orthogonal to a substantially linear measurement stroke 110. However, in other aspects non-linear strokes may also be used. Moreover, the measurement axis may also be substantially orthogonal or non-orthogonal to the tangent of the measurement stroke or the angle between the measurement axis and the measurement stroke may predictably vary along the measurement stroke. Also, the magnetic field may be measured with respect to any number of measurement axes.

In this example, the measurement stroke 110 is substantially coplanar with the magnetic axes of the three magnets 104, 106, and 108, parallel to the magnetic axis of the second magnet 106 and orthogonal to the magnetic axes of the first 104 and third 108 magnets. However, depending on the application the stroke is not required to be orthogonal, parallel, or coplanar, and may be skew with any number of magnetic axes of the three magnets 104, 106, and 108.

In an example, the measurement indicates the magnitude of the field. However, the measurement may indicate the magnetic field's relative direction, a combination of magnitude and direction, or otherwise.

Figure 2:
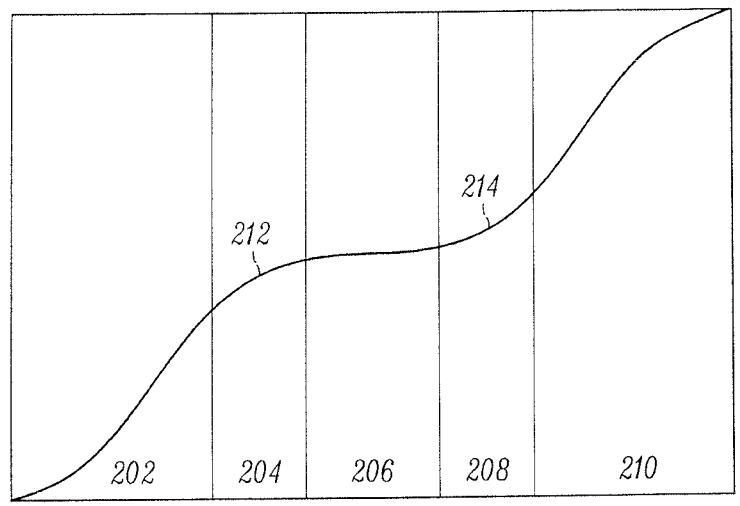
FIG. 2 comprises a spatial directional magnitude diagram of a magnetic field established by an exemplary two-magnet assembly as measured with respect to a measurement axis along a measurement stroke.

With reference to FIG. 2, the magnitude component of an exemplary cumulative magnetic field of a two-magnet assembly, that is the exemplary three-magnet assembly with the second magnet 106 removed, along an exemplary measurement stroke features a relatively high upward slope in the first 202 and second 210 end regions of the stroke with first 212 and second 214 transitions in the slope from relatively high to relatively low in the first 204 and second 206 transition regions between the middle region 206 and the respective first 202 and second 210 end regions of the stroke, and a relatively low upward slope in the relatively narrow middle region 206.

Figure 3:
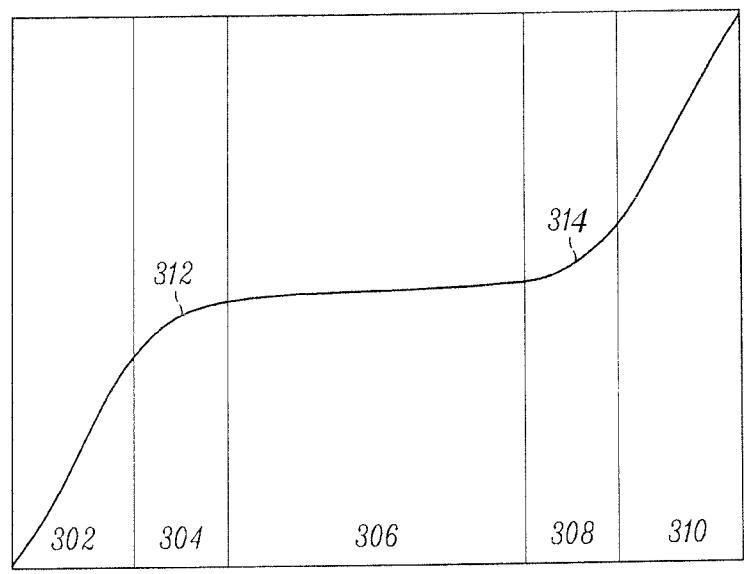
FIG. 3 comprises a spatial directional magnitude diagram of a magnetic field established by an exemplary three-magnet assembly as measured with respect to a measurement axis along a measurement stroke.

With reference to FIG. 3, the magnitude component of an exemplary cumulative magnetic field of a three-magnet assembly along an exemplary measurement stroke features a relatively high upward slope in the first 302 and second 310 end regions of the stroke with the first 312 and second 314 transitions in the slope from relatively high to relatively low in the first 304 and second 308 transition regions between the middle region 306 and the respective first 302 and second 310 end regions of the stroke, and a relatively low upward slope in the relatively wide middle region 306.

In summary, comparing FIG. 2 to FIG. 3, the middle region 306 of the exemplary three-magnet assembly field is widened and flattened in comparison to the corresponding middle region 206 of the exemplary two-magnet assembly field. Control over the width and flatness in the middle region 306, the steepness of the transitions 312 and 314, and the slope in the end regions 302 and 310 of the measurement stroke for a three-magnet assembly is enhanced over the control of those characteristics available in the two-magnet assembly through the selection of a suitable second magnet 104 in combination with selecting suitable first 102 and third 106 magnets.

In an example, the resolution of a measurement device is constant over the stroke. In another example, the resolution of the measurement device predictably varies over the stroke, field magnitude or direction. In an aspect, the magnetic field sensor of the magnetic field measurement device comprises a Hall effect sensor.

In an example, the cumulative magnetic field measurement, as measured along the measurement stroke with respect to a measurement axis is monotonic with at least one inflection region, increased flatness in a middle region. In some examples, the cumulative magnetic field measurement, as measured along the measurement stroke with respect to a measurement axis features increased concavity or convexity, as applicable, between the middle region and the end regions of the stroke.

In an example, the cumulative magnetic field measurement, as measured along the stroke with respect to an axis is strictly monotonic. In an aspect, the inflection region of the magnetic field measurement is a straight segment. In another aspect, the inflection region of the magnetic field measurement is an inflection point.

In an example, the position sensor is configured to sense position at a higher resolution in at least one first region along a measurement stroke, and at a lower resolution in at least one second region along the measurement stroke, the first region being different from the second region. In an aspect, the position is sensed at a higher resolution in proximity to the end points of the stroke, and at a lower resolution elsewhere. In an aspect, the resolution of position sensing is spatially varied by the non-linearly spatially varying magnetic field.

In an example, the position sensor is configured to measure a magnetic field and correlate the measurement to an expected position. In an aspect, the magnetic field measurement is correlated to the expected position using a look-up table. In an aspect, the magnetic field measurement is correlated to the expected position using a mathematical formula. In an aspect the magnetic field measurement is correlated to the expected position using an analog circuit.

Figure 4:
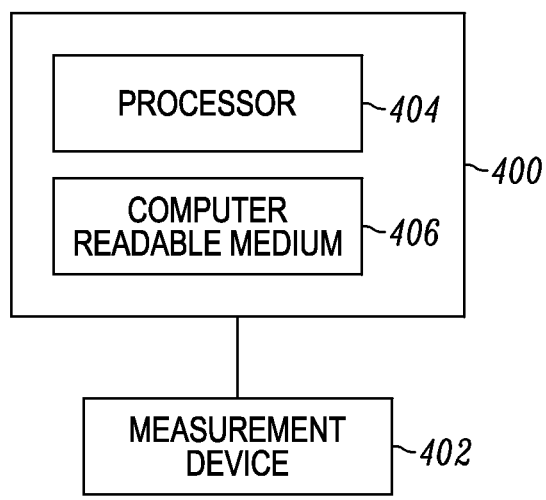
FIG. 4 comprises a diagram of an exemplary position sensing system.

With reference to FIG. 4, the magnetic field measurement is correlated to the expected position by an exemplary controller 400 communicatively coupled to the measurement device 402, the controller 400 comprising one or more processors 404 configured to execute program instructions for correlating magnetic field measurements to expected positions, the instructions or data for correlating magnetic field measurements to expected positions being stored in a computer readable medium 406, the computer readable medium not being a transient signal. Moreover, the communicative coupling may be a voltage, a pulse width modulated signal, a wireless signal, or any other variable signal indicative of differences in the magnetic field. Furthermore, a combination of any of the previous methods for correlating magnetic field measurement to expected positions may also be used. Furthermore, additional factors other than the magnetic field measurement may also be used in sensing the position.

With reference to FIG. 1 and continued reference to FIG. 4, in an example, the measurement device 402 comprises a magnetic field sensor 112, the magnetic field sensor associated in a movable relationship with the three magnets 104, 106, and 108. In an aspect the movable relationship is along a measurement stroke 110.

In an example, the position sensor is a linear position sensor. In an aspect, the position sensor is configured to verify status or location in a mechanical transmission, such as, for example, an automotive transmission. However, the position sensor may also be configured to sense position in other environments and for purposes other than just verifying status or location.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention. Further, those skilled in the art will recognize that the approaches described herein may also be used in systems that use differences in position to determine velocity, speed, or acceleration, among other quantities.

What is claimed is:

1. A magnetic apparatus comprising:
    at least three magnets comprising a first, a second, and a third magnet, each magnet having a north pole and a south pole,
    the at least three magnets positioned along a first axis;
    the second magnet positioned between the first magnet and the third magnet;
    the north pole of the first magnet and the south pole of the third magnet facing substantially away from the first axis;
    wherein the second magnet's north pole is more proximate to the first magnet than to the third magnet so as to cause magnetic field measurements taken along a measurement stroke by a position sensor to be at a higher position resolution in proximity to end points of the measurement stroke and at a lower position resolution along other points on the measurement stroke.

2. The magnetic apparatus as recited in claim 1, wherein a pole piece is positioned along the first axis, the at least three magnets positioned on a side of the pole piece.

3. The magnetic apparatus as recited in claim 1, wherein the magnets are configured to establish a magnetic field, the magnetic field having a component, wherein a measurement of the component when graphed with respect to positions along the measurement stroke is substantially continuous between global extrema of the measurement, the global extrema being at the endpoints of the measurement stroke.

4. The magnetic apparatus of claim 3, wherein the measurement stroke is substantially linear.

5. The magnetic apparatus of claim 3, wherein the measurement when graphed with respect to positions along the measurement stroke passes from one global extremum to another relatively rapidly near endpoints of the measurement stroke and relatively slowly in a middle region of the measurement stroke.

6. The magnetic apparatus of claim 5, wherein the middle region has a relatively low slope as compared to outside the middle region, and the middle region is wider than the middle region would be absent the second magnet's north pole being more proximate to the first magnet than to the third magnet.

7. The magnetic apparatus of claim 3, wherein the component is magnetic field strength.

8. The magnetic apparatus of claim 3, wherein the component is magnetic field strength with respect to a measurement axis.

9. The magnetic apparatus of claim 8, wherein the measurement axis is substantially orthogonal to the measurement stroke.

10. The magnetic apparatus of claim 3, wherein the measurement when graphed with respect to positions along the measurement stroke is monotonic between the global extrema.

11. The magnetic apparatus of claim 3, wherein the measurement when graphed with respect to positions along the measurement stroke is strictly monotonic between the global extrema.

12. The magnetic apparatus of claim 1, wherein the position sensor comprises a magnetic field sensor in a moveable relationship along the measurement stroke with the at least three magnets.

13. The magnetic apparatus of claim 12, wherein the magnetic field sensor comprises a Hall effect sensor.

14. The magnetic apparatus of claim 12, wherein the magnetic field sensor is comprised in a measurement device, the measurement device being communicatively coupled with a controller, the controller comprising at least one processor configured to execute program instructions for correlating magnetic field measurements to expected positions.

15. The magnetic apparatus of claim 12, further comprising a computer readable medium configured to store at least one of the members selected from the group of the program instructions and data for correlating magnetic field measurements to expected positions.

16. A method of sensing position comprising: establishing a cumulative magnetic field comprising at least three portions, a first, a second, and a third portion, the first portion being established with a first magnet positioned along a first axis and including a north pole facing in a first direction, the third portion being established with a third magnet positioned along the first axis and including a north pole facing in a direction opposite the first direction, the second portion being established with a second magnet positioned between the first and third magnets, wherein the second magnet includes a north pole facing in a direction substantially transverse to the first and second directions, and position sensing a component of the cumulative magnetic field to obtain a measurement, the second magnet being positioned between the first and third magnets and the second magnet's north pole facing in a direction substantially transverse to the first and second directions cause the position sensing to be at a higher resolution in proximity to end points of a measurement stroke and to be sensed at a lower resolution along other points on the measurement stroke.

17. The method as recited in claim 16, including positioning the first, second and third magnets along a pole piece, the pole piece disposed along the first axis.

18. The method as recited in claim 16, wherein the measurement when graphed with respect to positions along the measurement stroke comprises a substantially flat middle region and first and second sloped regions.

19. The method as recited in claim 18, wherein the measurement when graphed with respect to positions along the measurement stroke passes from one global extremum to another with relatively more slope near endpoints of the measurement stroke and with relatively less slope in a middle region of the measurement stroke, the middle region being relatively wider than the middle region would be absent the second magnet being positioned between the first and third magnets and the second magnet's north pole facing in a direction substantially transverse to the first and second directions.

20. The method as recited in claim 18, including receiving the measurement at a controller and correlating the measurement to an expected position.

* * * * *